United States Patent
Liu et al.

(10) Patent No.: US 9,504,031 B2
(45) Date of Patent: Nov. 22, 2016

(54) RESOURCE ALLOCATION AND JOINT TRANSMISSION

(75) Inventors: Jinhua Liu, Beijing (CN); Zhan Zhang, Beijing (CN)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 30 days.

(21) Appl. No.: 14/417,495

(22) PCT Filed: Aug. 2, 2012

(86) PCT No.: PCT/CN2012/001036
§ 371 (c)(1),
(2), (4) Date: Jan. 26, 2015

(87) PCT Pub. No.: WO2014/019106
PCT Pub. Date: Feb. 6, 2014

(65) Prior Publication Data
US 2015/0189636 A1    Jul. 2, 2015

(51) Int. Cl.
*H04B 7/212* (2006.01)
*H04W 4/00* (2009.01)
(Continued)

(52) U.S. Cl.
CPC .......... *H04W 72/044* (2013.01); *H04L 5/0035* (2013.01); *H04W 28/16* (2013.01); *H04W 72/042* (2013.01); *H04W 72/0486* (2013.01); *H04W 72/085* (2013.01)

(58) Field of Classification Search
CPC . H04L 5/0032; H04L 5/0062; H04L 5/0096; H04L 5/005; H04L 5/0053; H04W 72/0406
See application file for complete search history.

(56) References Cited

U.S. PATENT DOCUMENTS

| 7,082,111 B2* | 7/2006 | Amouris ............ H04B 7/2656 370/321 |
| 2004/0125784 A1* | 7/2004 | Lee ................... H04B 7/18584 370/345 |

(Continued)

FOREIGN PATENT DOCUMENTS

| CN | 102318256 A | 1/2012 |
| CN | 102612090 A | 7/2012 |

(Continued)

OTHER PUBLICATIONS

International Search Report, PCT Application No. PCT/CN2012/001036, May 9, 2013.
(Continued)

*Primary Examiner* — Melanie Jagannathan
(74) *Attorney, Agent, or Firm* — Patents on Demand, P.A.; Brian K. Buchheit; Scott M. Garrett (57) ABSTRACT

The embodiments relate to a method and a controlling unit for resource allocation and joint transmission in a cellular communication network. The method includes allocating a first set of frequency resources for transmitting a first set of time slots of data in a subframe, from a first communication node to a User Equipment, UE, and allocating at least one second set of frequency resources for transmitting, at least one second set of time slots of data in the subframe, from at least one second communication node respectively to the UE. The first set of frequency resources is intersected with one of the at least one second set of frequency resources, and union of the first set of time slots of data and the at least one second set of time slots of data is equal to the subframe.

11 Claims, 4 Drawing Sheets

(51) Int. Cl.
*H04W 72/04* (2009.01)
*H04W 28/16* (2009.01)
*H04L 5/00* (2006.01)
*H04W 72/08* (2009.01)

(56) References Cited

U.S. PATENT DOCUMENTS

| | | | |
|---|---|---|---|
| 2008/0085718 A1* | 4/2008 | Kuchibhotla | H04W 72/042 455/452.1 |
| 2008/0102846 A1* | 5/2008 | Kim | H04W 72/085 455/450 |
| 2010/0272074 A1* | 10/2010 | Cheng | H04B 7/024 370/336 |
| 2010/0323744 A1* | 12/2010 | Kim | H04W 52/06 455/522 |
| 2011/0070912 A1* | 3/2011 | Kang | H04W 16/14 455/509 |
| 2011/0237282 A1* | 9/2011 | Geirhofer | H04B 7/024 455/509 |
| 2011/0244877 A1* | 10/2011 | Farajidana | H04L 5/0023 455/452.2 |
| 2011/0292903 A1* | 12/2011 | Jongren | H04L 5/0032 370/329 |
| 2012/0033628 A1* | 2/2012 | Eriksson | H04W 72/1284 370/329 |
| 2012/0106374 A1* | 5/2012 | Gaal | H04L 5/0048 370/252 |
| 2012/0120998 A1* | 5/2012 | Fakhrai | H04B 7/0413 375/224 |
| 2014/0200016 A1* | 7/2014 | Siomina | H04W 24/08 455/450 |

FOREIGN PATENT DOCUMENTS

| | | |
|---|---|---|
| WO | WO 2010/093301 A1 | 8/2010 |
| WO | WO 2011/097523 A1 | 8/2011 |

OTHER PUBLICATIONS

Written Opinion of the International Searching Authority, PCT Application No. PCT/CN2012/001036, May 9, 2013.

3GPP, Technical Report, "3rd Generation Partnership Project; Technical Specification Group Radio Access Network; Evolved Universal Terrestrial Radio Access (E-UTRA); Further advancements for E-UTRA physical layer aspects (Release 9)", 3GPP TR 36.814 V9.0.0 (Mar. 2010), 107 pp.

* cited by examiner

RESOURCE ALLOCATION AND JOINT TRANSMISSION

CROSS REFERENCE TO RELATED APPLICATION

This application is a 35 U.S.C. §371 national stage application of PCT International Application No. PCT/CN2012/001036, filed on 2 Aug. 2012, the disclosure and content of which is incorporated by reference herein in its entirety. The above-referenced PCT International Application was published in the English language as International Publication No. WO 2014/019106 A1 on 6 Feb. 2014.

TECHNICAL FIELD

The technology generally relates to Coordinated Multi-point transmission/reception (CoMP) in a cellular network, more particularly to a method and device for resource allocation and joint transmission in a cellular communication network.

BACKGROUND

Recently, cooperative communications have been studied to exploit diversity in order to achieve better network performance. The concepts for CoMP are proposed by 3rd Generation Partnership Project (3GPP), e.g. in TR 36.814, release 9, "Evolved Universal Terrestrial Radio Access (E-UTRA); Further advancements for E-UTRA physical layer aspects". CoMP refers to a system where the transmissions and/or reception at multiple, geographically separated antenna sites are coordinated in order to improve system performance. CoMP may significantly enhance cell average and cell edge throughput. However, the transmissions must be carefully coordinated to avoid causing undesired interferences.

Figure 1A:
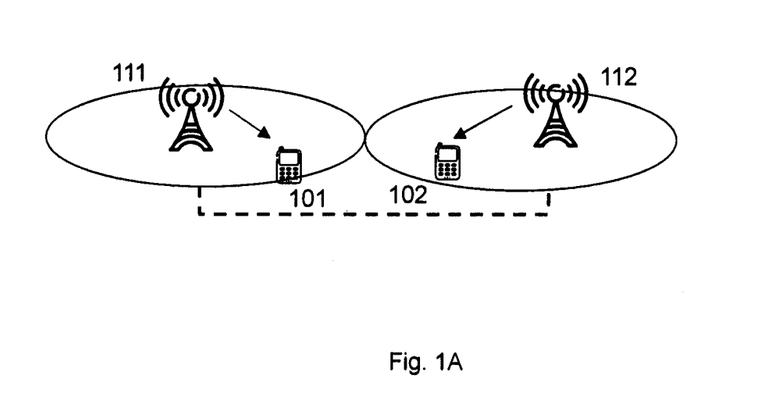
FIGS. 1A to 1C illustrate three typical modes of DL CoMP coordination mode.

There are three typical types of DL CoMP coordination mode discussed by 3GPP. The first mode is Coordinated Scheduling (CS), as shown in FIG. 1A. In the CS, each UE is served by only one site. The site hereinafter may be a macro/micro/pico cell, evolved NodeB (eNB), a relay cell, a repeater, etc. For example, a UE 101 is served by an eNB 111, and a UE 102 is served by an eNB 112. There are certain coordinations between the two eNBs, as indicated by dashed lines. The CS mode is to schedule the DL transmission from the eNB 112 to UE 102 in different time-frequency resources than the transmission from the eNB 111 to UE 101, and vice versa, so that the experienced interference from the eNB 112 to the UE 101 is reduced.

Figure 1B:
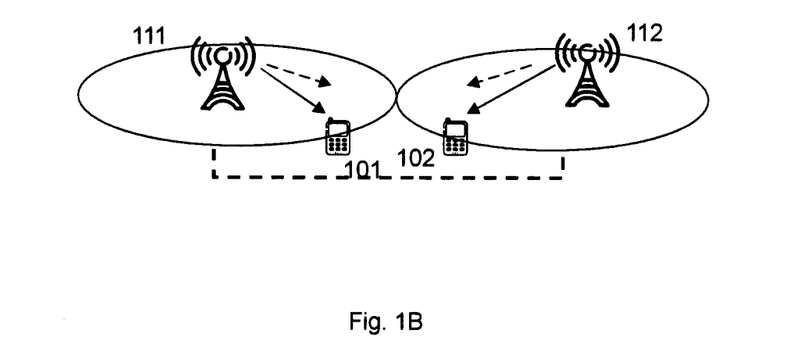

The second mode is Coordinated Beamforming (CB), as shown in FIG. 1B. In this mode, the interference caused by DL transmissions from the eNB 112 to the UE 101 can be reduced by spatially nulling the beams targeting the UE 101 (as shown in dashed arrows) by certain coordination of the precoding between the eNBs. The interference caused by DL transmissions from the eNB 111 to the UE 102 can be also reduced by spatially nulling the beams targeting the UE 102.

Figure 1C:
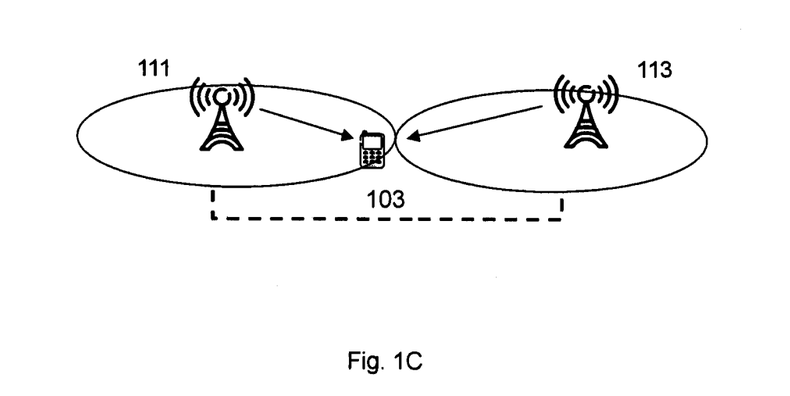

The third mode is coherent Joint Transmission (JT), as shown in FIG. 1C. In this mode, multiple sites transmit the same signals at least over a subframe, to the same UE simultaneously using the same resources. For example, the eNBs 111 and 112 transmit the same signals to a UE 103 using the same resource. The signals from the two eNBs are coherently combined in the air interface when they reach the UE 103, and the signal to noise and interference ratio (SINR) at the UE 103 may be improved.

The coherent JT is transparent to the UE if UE specific DeModulation Reference Signal (DM-RS) is utilized and coherently transmitted by the serving sites of the UE. However, each serving site for the UE is required to allocate the same full set of resource blocks to transmit the same subframe to the UE. In other words, if one site is to transmit a subframe of signal to a UE using a set of resource blocks, then another site can not join the coherent JT unless it has the same set of resource blocks available to transmit the same subframe. Such requirement limits the time frequency resource utilization and restricts the scheduling and link adaptation.

SUMMARY

Therefore, it is an object to solve at least one of the above-mentioned problems.

According to an aspect of the disclosure, a method for resource allocation and joint transmission in a cellular communication network is provided. The method comprises allocating a first set of frequency resources for transmitting a first set of time slots of data in a subframe, from a first communication node to a UE, and allocating at least one second set of frequency resources for transmitting, at least one second set of time slots of data in the subframe, from at least one second communication node respectively to the UE. The first set of frequency resources is intersected with one of the at least one second set of frequency resources, and union of the first set of time slots of data and the at least one second set of time slots of data is equal to the subframe.

According to another aspect of the disclosure, a controlling unit for resource allocation and joint transmission in a cellular communication network is provided. The controlling unit comprises a first allocating unit adapted to allocate a first set of frequency resources for transmitting, a first set of time slots of data in a subframe, from a first communication node to a UE, and a second allocating unit adapted to allocate at least one second set of frequency resources for transmitting, at least one second set of time slots of data in the subframe, from at least one second communication node respectively to the UE. The first set of frequency resources is intersected with one of the at least one second set of frequency resources, and union of the first set of time slots of data and the at least one second set of time slots of data is equal to the subframe.

BRIEF DESCRIPTION OF THE DRAWINGS

The present disclosure will be described in detail by referring to the following drawings, in which.

DETAILED DESCRIPTION

Embodiments of the present disclosure will be described in more detail hereinafter with reference to the accompanying drawings. These embodiments may, however, be embodied in many different forms and should not be construed as limited to the embodiments set forth herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belong. It will be further understood that terms used herein should be interpreted as having a meaning that is consistent with their meaning in the context of this specification and the relevant art and will not be interpreted in an idealized or overly formal sense unless expressly so defined herein.

The present disclosure is described below with reference to block diagrams and/or flowchart illustrations of methods, apparatus (systems) and/or computer program products according to embodiments of the present disclosure. It is understood that blocks of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present embodiments may be embodied in hardware and/or in software (including firmware, resident software, micro-code, etc.). Furthermore, the present embodiments may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

Although the present disclosure is described with reference to the Long Term Evolution (LTE)-based communication network in the context, the present embodiments are also applicable to other types of networks employing cooperative communications. Although specific terms in some specifications are used here, such as eNB, it should be understood that the embodiments are not limited to those specific terms but can be applied to all similar entities.

Embodiments of the present disclosure will be described below with reference to the drawings.

The present disclosure proposes a new JT mode, herein below referred to as Ad-hoc resource Cooperation Joint Transmission (ACJT), which may eliminate or alleviate the limitation of coherent JT.

Figure 2:
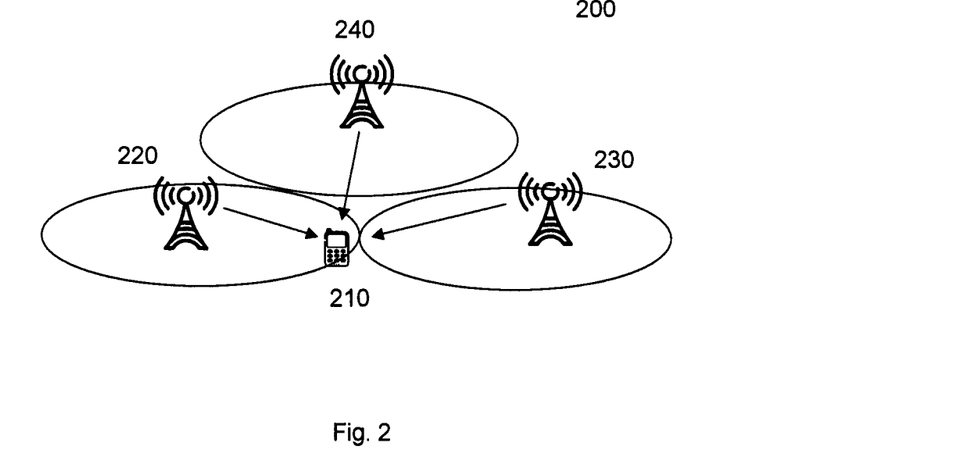
FIG. 2 is a schematic view of a cellular communication network 200 in accordance with an embodiment of the present disclosure.

FIG. 2 is a schematic view of a cellular communication network 200 in accordance with an embodiment of the present disclosure.

In the cellular communication network 200, a UE 210 is served by three eNBs 220, 230 and 240, as shown in FIG. 2. In practice, a candidate serving site, although has some radio resource available, may not join the coherent JT to help a neighbouring site since it has to serve UEs in its own cell or perform Hybrid Automatic Repeat Request (HARQ) retransmissions at certain resource blocks. The resource blocks may include time-frequency blocks, or other type of resource blocks, e.g. time-frequency-code blocks. The application of coherent JT is thus seriously limited. Unlike the coherent JT which requires the same subframe of signal should be transmitted from each of the serving sites to the UE at the corresponding set of e.g. frequency resources, a site in the ACJT mode may contribute to the joint transmission by transmitting only a part of the subframe of signal at the corresponding part of the frequency resources. Thus a site may help a neighbouring site as long as it has part of the required resource blocks available. In addition to improving the radio resource utilization and increase system throughput, the ACJT mode enhances the flexibility of cooperative scheduling between sites. The limitation of the coherent JT is significantly alleviated.

Figure 3A:
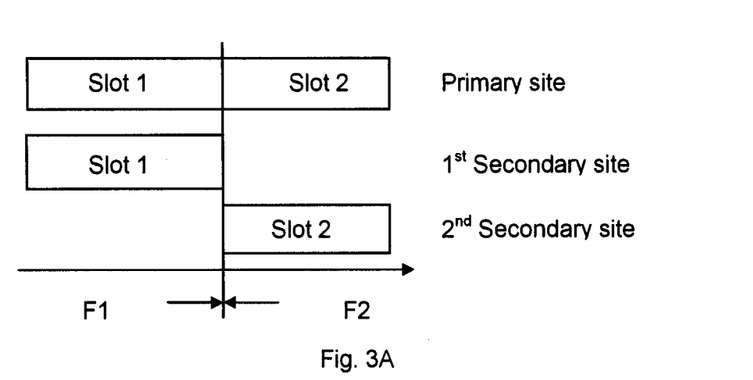
FIGS. 3A and 3B schematically show two resource allocation schemes in accordance with an embodiment of the present disclosure.
Figure 3B:
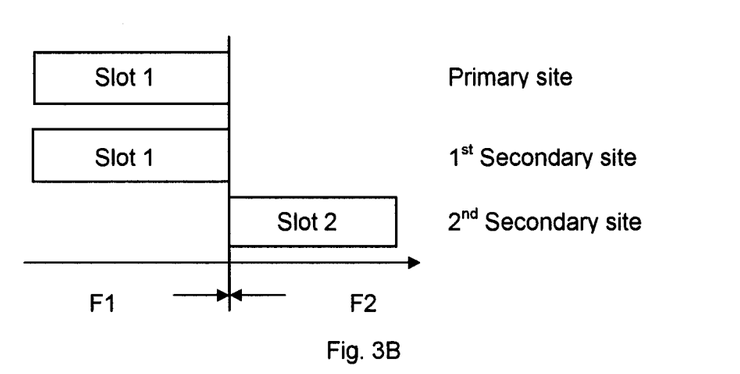

FIGS. 3A and 3B schematically show two resource allocation schemes in accordance with an embodiment of the present disclosure. For purpose of simplicity, only the frequency axis is illustrated.

A serving site that transmit all or most of the data blocks to the UE, such as the eNB 220 in FIG. 2, may be referred to as a primary serving site. Other sites that contribute to the joint transmission, such as the eNBs 230 and 240 in FIG. 2, may be referred to as secondary serving sites. However, it should be noted that the roles of primary serving set and secondary sites may be exchanged, depending on the channel conditions and scheduling strategy. For instance, in a LTE Frequency Division Duplexing (FDD) mode system, a LTE frame has an overall length of 10 ms and is divided into a total of 10 subframes. Each subframe then consists of two time slots, referred to as slots 1 and 2. However, it should be understood that the frame structure may vary in other communication networks.

In an embodiment as illustrated in FIG. 3A, if the two time slots in the subframe are to be transmitted to the UE, the primary site such as eNB 220 may transmit both time slots of data, i.e. slots 1 and 2, using corresponding set of frequency resources, e.g. F1 and F2. The secondary sites do not need to have the same set of frequency resources available to transmit both time slots of data, but may join the ACJT as long as it has part of frequency resources available. The first secondary site such as eNB 230 may join the ACJT and transmit data of the slot 1 to the UE at the F1. The second secondary site such as eNB 240 may join the ACJT and transmit data of the slot 2 to the UE at the F2. The data transmitted from the three sites are coherently combined in the air interface when reaching the UE and the SINR at the UE may be improved. In a variation of the embodiment where the same frequency resources are allocated for the sites, the primary site may transmit both time slots of data, i.e. slots 1 and 2, using the frequency resource, e.g. F1. The first secondary site may join the ACJT and transmit data of the slot 1 to the UE at the F1. The second secondary site may join the ACJT and transmit data of the slot 2 to the UE at the F1. That is, the first and second secondary sites transmit data respectively at the slot 1 and slot 2, using the same frequency resource. The data transmitted from the three sites still may be coherently combined in the air interface when reaching the UE.

In another embodiment as illustrated in FIG. 3B, the primary site only transmits data of the slot 1 to the UE at the F1. The first secondary site transmits data of the slot 1 to the UE at the F1, and the second secondary site transmits data of the slot 2 to the UE at the F2. That is, none of the serving sites transmits a complete subframe of data, but the partial data transmitted by all serving site forms the complete subframe. Nevertheless, data transmitted from these sites may still be coherently combined at the UE and the SINR may be improved. In a variation of the embodiment where the frequency resources allocated to the sites are the same, the primary site only transmits data of the slot 1 to the UE at the F1, the first secondary site transmits data of the slot 1 to the UE at the F1, and the second secondary site transmits data of the slot 2 to the UE at the F1. The data transmitted from the three sites still may be coherently combined in the air interface when reaching the UE.

To generalize, the resource utilization and SINR will be improved as long as 1) the set of frequency resources allocated to the primary serving site is intersected with the set of frequency resources allocated to one of the secondary serving sites, so that the combination gain may be achieved; and 2) union of the sets of time slots of data to be transmitted by the serving sites is equal to the subframe, so that the UE is guaranteed to receive a complete subframe. The terminology "intersected" used herein means "overlapped". For example, in FIG. 3A, the set of frequency resource (F1, F2) allocated in the primary serving site is partly intersected with either set of frequency resources allocated in the first (F1) or second secondary serving site (F2), and the union of the set of time slots of data to be transmitted by the primary serving site (slots 1 and 2), the set of time slots of data to be transmitted by the first secondary serving site (slot 1) and the set of time slots of data to be transmitted by the second secondary serving site (slot 2) is equal to the subframe. In FIG. 3B, the set of frequency resource (F1) allocated in the primary serving site is intersected with the set of frequency resources allocated in the first (F1) secondary serving site, and the union of the set of time slots of data to be transmitted by the primary serving site (slot 1), the set of time slots of data to be transmitted by the first secondary serving site (slot 1) and the set of time slots of data to be transmitted by the second secondary serving site (slot 2) is equal to the subframe.

Figure 4:
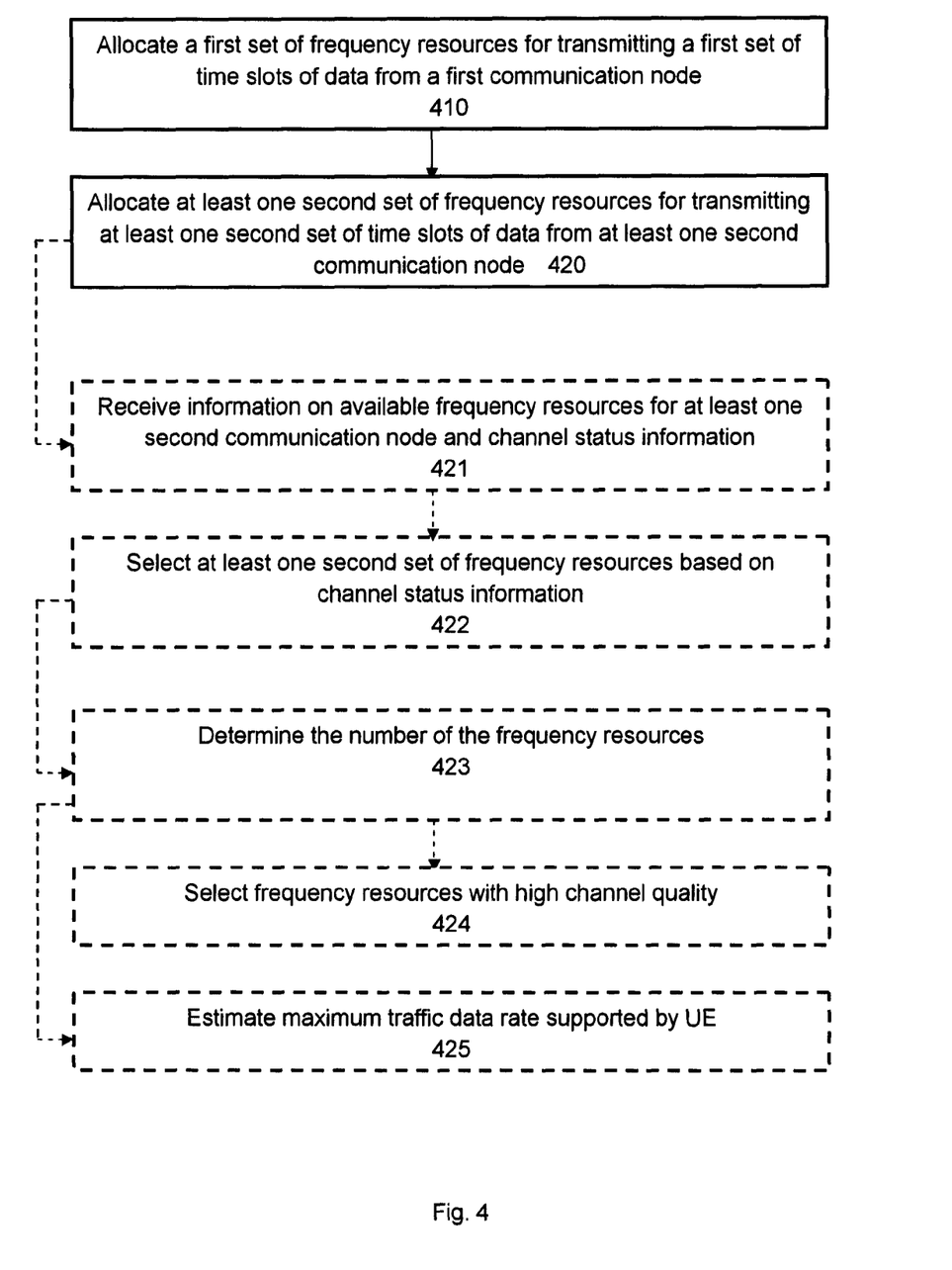
FIG. 4 shows a flowchart of a method for resource allocation and joint transmission in a cellular network in accordance with an embodiment of the present disclosure.

FIG. 4 shows a flowchart of a method 400 for resource allocation and joint transmission in a cellular network in accordance with an embodiment of the present disclosure.

At step 410, in the ACJT mode, a first set of frequency resources is allocated for transmitting a first set of time slots of data in a subframe from a first communication node, such as eNB 220, to a UE, such as UE 210. At step 420, at least one second set of frequency resources is allocated for transmitting respectively at least one second set of time slots of data in the subframe from a second communication node, such as eNB 230, to the UE. The first set of frequency resources is intersected with one of the at least one second set of frequency resources, and union of the first set of time slots of data and the at least one second set of time slots of data is equal to the subframe.

Each time slot of data that is to be jointly transmitted should be transmitted at the same frequency so that the procedure is transparent to the UE. The case that both the first set of time slots of data and the at least one second set of time slots of data are equal to the subframe should be excluded to distinguish from the coherent JT mode. The method may be performed either by the first communication node if it is acting as a primary serving site, or by a controlling communication node of the first communication node.

When allocating the second set of frequency resources, it may improve the transmission rate by selecting from the available frequencies those with good channel quality. In the example as illustrative in FIG. 3A, both the first secondary site and the second secondary site may be allocated with the frequency 1 for jointly transmission if the channel quality on frequency 1 is better than that on frequency 2. The first communication node may receive at step 421 information on available frequency resources for the at least one second communication node and channel status information between the at least one second communication node and the UE, and select at step 422 the at least one second set of frequency resources from the available frequency resources based on the channel status information. In addition, the number of frequency resources of the at least one second set of frequency resources may be determined at step 423 based on the channel status information, traffic data rate desired by the UE and maximum traffic data rate acceptable by the UE. The first communication node may select at step 424 frequency resources with good channel quality as indicated by the channel status information as the at least one second set of frequency resources. For example, if the channel quality as indicated by the channel status information is good enough to fulfill the desired traffic data rate or the maximum traffic data rate acceptable by the UE, then it is not necessary to allocate all or many of the available frequency resources for joint transmission by the at least one second communication node. Frequency resources with good channel quality may be allocated high priority.

When determining the number of frequency resources of the at least one second set of frequency resources, the maximum traffic data rate acceptable by the UE may be estimated at step 425 by channel quality between the first communication node and the UE, channel quality between the at least one second communication node and the UE, the number of frequency resources allocated to the UE by the first communication node and the number of frequency resources allocated to the UE by the at least one second communication node.

In one embodiment, an intermediate parameter equivalent Channel Quality Indication (CQI) $CQI_{eq}$ between the first communication node, the at least one second communication node and the UE is introduced to estimate the maximum traffic data rate acceptable by the UE. The $CQI_{eq}$ may be obtained by the formula below:

$$CQI_{eq} = f(CQI_1, N_{R,1}, CQI_2, N_{R,2}, \ldots, CQI_P, N_{R,P}, L_c)$$

where P is the total number of the first communication node and the at least one second communication node, p is the index of P ($1 \leq p \leq P$), $L_c$ is combining loss at the UE, $CQI_p$ is the CQI of the p-th communication node; $N_{R,P}$ is the number of resources allocated to the UE by the p-th communication node, and f may be, e.g. an averaging or weighting function. The formula may be simplified as $$CQI_{eq} = lin2dB\left[\frac{1}{N_{R,total}}\sum_{p=1}^{P} N_{R,p} dB2lin(CQI_p)\right] + L_c$$

where $N_{R,total}$ is the total number of resources allocated to the UE by the first communication node and the at least one second communication node in which overlapped resources between communication nodes are not repeatedly countered, lin2dB represents a conversion from linear values into dB and dB2lin represents a conversion from dB into linear values.

Figure 5:
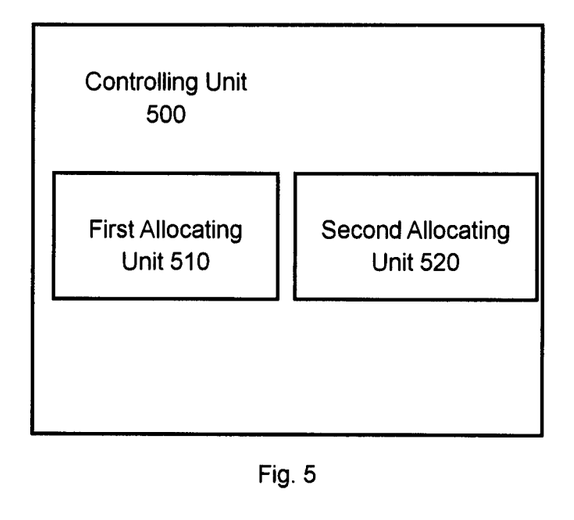
FIG. 5 shows a block diagram of a controlling unit for resource allocation and joint transmission in a cellular network in accordance with an embodiment of the present disclosure.

FIG. 5 shows a block diagram of a controlling unit 500 for resource allocation and joint transmission in a cellular network in accordance with an embodiment of the present disclosure.

The controlling unit 500 may be implemented in at least one of the first communication node, the at least one second communication code and a controlling node of the first communication node. The controlling unit 500 includes a first allocating unit 510 and a second allocating unit 520. The first allocating unit is adapted to allocate a first set of frequency resources for transmitting, a first set of time slots of data in a subframe, from a first communication node to a UE. The second allocating unit is adapted to allocate at least one second set of frequency resources for transmitting, at least one second set of time slots of data in the subframe, from at least one second communication node respectively to the UE. The first set of frequency resources is intersected with one of the at least one second set of frequency resources, and union of the first set of time slots of data and the at least one second set of time slots of data is equal to the subframe. The second allocating unit 520 may be further adapted to receive information on available frequency resources for the at least one second communication node and channel status information between the at least one second communication node and the UE, and select the at least one second set of frequency resources from the available frequency resources based on the channel status information. The second allocating unit 520 may be further adapted to determine the number of the frequency resources of the at least one second set of frequency resources based on the channel status information, traffic data rate desired by the UE and maximum traffic data rate acceptable by the UE. The second allocating unit 520 may be further adapted to select frequency resources with good channel quality as indicated by the channel status information as the at least one second set of frequency resources. The second allocating unit 520 may be further adapted to estimate the maximum traffic data rate acceptable by the UE by channel quality between the first communication node and the UE, channel quality between the at least one second communication node and the UE, the number of frequency resources allocated to the UE by the first communication node and the number of frequency resources allocated to the UE by the at least one second communication node.

In practice, there is channel interpolation over the frequency domain, which might cause channel estimation loss at edges of resource block sets allocated to different sites. From this perspective, the number of edges within a subframe should be minimized by means of optimized scheduling. Moreover, advanced channel estimation (CE) schemes at UE could relieve this problem. As mentioned above, the ACJT mode may be transparent to the UE and the existing UEs do not need to be modified. As an alternative, it may be helpful for the UE to do better channel estimation if it is informed of the ACJT mode. In this case, a minor modification may be made to the standard. For example, a new signaling may be introduced to explicitly inform the UE of the ACJT mode.

While the preferred embodiments have been illustrated and described, it will be understood that various changes and modifications may be made, and equivalents may be substituted for elements thereof without departing from the true scope of the present disclosure. In addition, many modifications may be made to adapt to a particular situation and the teaching herein without departing from its central scope. Therefore it is intended that the presently described embodiments are not limited to the particular embodiments disclosed as the best mode contemplated for carrying out the described embodiments, but that the present disclosure include all embodiments falling within the scope of the appended claims.

The invention claimed is:

1. A method for resource allocation and joint transmission in a cellular communication network, the method comprising:
    allocating a first set of frequency resources for transmitting a first set of time slots of data in a subframe, from a first communication node to a User Equipment, UE; and
    allocating at least one second set of frequency resources for transmitting, at least one second set of time slots of data in the subframe, from at least one second communication node respectively to the UE, wherein the first set of frequency resources is intersected with one of the at least one second set of frequency resources, and union of the first set of time slots of data and the at least one second set of time slots of data is equal to the subframe.

2. The method of claim 1, wherein said allocating the at least one second set of frequency resources comprises:
    receiving information on available frequency resources for the at least one second communication node and channel status information between the at least one second communication node and the UE; and
    selecting the at least one second set of frequency resources from the available frequency resources based on the channel status information.

3. The method of claim 2, wherein said selecting the at least one second set of frequency resources comprises:
    determining the number of the frequency resources of the at least one second set of frequency resources based on the channel status information, traffic data rate desired by the UE and maximum traffic data rate supported by the UE.

4. The method of claim 2, wherein said selecting the at least one second set of frequency resources comprises:
    selecting frequency resources with high channel quality as indicated by the channel status information as the at least one second set of frequency resources.

5. The method of claim 3, wherein said determining the number of the frequency resources of the at least one second set of frequency resources comprises:
    estimating the maximum traffic data rate supported by the UE by channel quality between the first communication node and the UE, channel quality between the at least one second communication node and the UE, the number of frequency resources allocated to the UE by the first communication node and the number of frequency resources allocated to the UE by the at least one second communication node.

6. A controller controlling for resource allocation and joint transmission in a cellular communication network, the controlling unit comprising:
    a first allocating component adapted to allocate a first set of frequency resources for transmitting, a first set of time slots of data in a subframe, from a first communication node to a User Equipment, UE; and a second allocating component adapted to allocate at least one second set of frequency resources for transmitting, at least one second set of time slots of data in the subframe, from at least one second communication node respectively to the UE, wherein the first set of frequency resources is intersected with one of the at least one second set of frequency resources, and union of the first set of time slots of data and the at least one second set of time slots of data is equal to the subframe.

7. The controller of claim 6, wherein the controller is implemented in at least one of the first communication node, the at least one second communication code and a controlling node of the first communication node.

8. The controller of claim 6, wherein the second allocating component is further adapted to:
receive information on available frequency resources for the at least one second communication node and channel status information between the at least one second communication node and the UE; and
select the at least one second set of frequency resources from the available frequency resources based on the channel status information.

9. The controller of claim 8, wherein the second allocating component is further adapted to:
determine the number of the frequency resources of the at least one second set frequency resources based on the channel status information, traffic data rate desired by the UE and maximum traffic data rate supported by the UE.

10. The controller of claim 9, wherein the second allocating component is further adapted to:
select frequency resources with high channel quality as indicated by the channel status information as the at least one second set of frequency resources.

11. The controller of claim 10, wherein the second allocating component is further adapted to:
estimate the maximum traffic data rate supported by the UE by channel quality between the first communication node and the UE channel quality between the at least one second communication node and the UE, the number of frequency resources allocated to the UE by the first communication node and the number of frequency resources allocated to the UE by the at least one second communication node.

* * * * *